Patented Jan. 21, 1936

2,028,403

UNITED STATES PATENT OFFICE 2,028,403

PLASTIC COMPOSITIONS OF MATTER

Joseph R. Mares, St. Louis, Mo., assignor to Monsanto Chemical Company, St. Louis, Mo., a corporation of Delaware No Drawing. Application April 30, 1931, Serial No. 534,125

7 Claims. (Cl. 106—40)

This invention relates to the manufacture of plastics, such for example, as articles of nitro cellulose, acetyl cellulose resins formed by the condensation of aldehydes with phenols or urea, as well as polyhydric-alcohol-polybasic-acid condensation products, and it has particular application to a novel class of solvents and plasticizers which when incorporated in the plastic, in the course of its manufacture or compounding operations, impart valuable properties and characteristics to the ultimate (lacquer, film, molding composition, impregnating composition or coating composition) product.

One object of this invention is to provide a class of compositions which have valuable solvent properties and impart other desirable properties to plastic compositions.

A further object of the invention is to provide a class of compositions which are particularly suited to the manufacture of cellulose ester and ether products, notably cellulose acetate products and cellulose nitrate products.

I have found that the acetal esters and ethers, for example, those formed from glycerin, possess exceptional solvent power for cellulose esters and ethers as well as synthetic resins such as those hereinabove enumerated.

This new class of solvent and plasticizing compositions may be prepared by various methods. In general they may be represented structurally, as follows:

where R represents an acid, alcohol or phenol residue and R' represents hydrogen, an alkyl, aryl or heterocyclic residue. Inasmuch as these compositions may be made in various ways from various raw materials the properties of the products, particularly, the melting point and boiling point fall within a wide range and may be selected with the view of the specific application which is to be made of the particular composition.

One method of manufacturing compositions falling within the scope of this invention consists in causing glycerin to react, preferably in the presence of an acid condensing agent such as hydrochloric acid, with an aldehyde such as formaldehyde, acetaldehyde, paraldehyde, butyl-aldehyde, benzaldehyde, furfural, etc., whereby an acetal is formed containing a free alcohol group. The reactions involved in each case are analogous and may be represented, as follows:

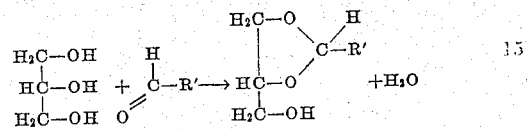

The product so obtained is caused to react with an acid, phenol or another alcohol to form products which fall within the class of compositions whose use is contemplated in the present invention. Various acids may be employed including acetic, propionic, oleic, stearic, benzoic, chlorbenzoic, phthalic, succinic, maleic, phosphoric, boric, etc. In the case of benzoic acid, esterification using the Schotten-Baumann reaction, may be represented, as follows:

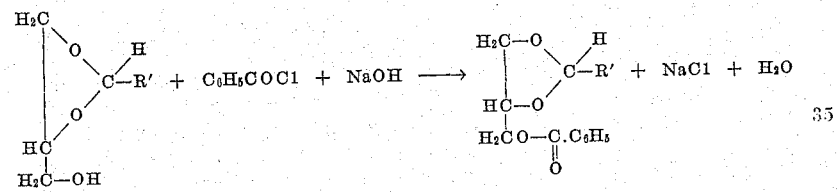

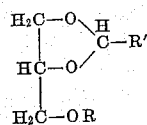

positions may be prepared by various methods. In general they may be represented structurally, as follows:

The product thus obtained in the case of formal-glycerol benzoate may be one of two isomers depending upon the acetal employed, one isomer having a melting point of 72°; the other being a viscous liquid at ordinary temperatures. Both of the materials will be found to have plasticizing properties and may be used to advantage in admixture with each other.

Another method of preparing compositions the use of which is herein set forth, involves reacting glycerin with acetylene in the presence of a catalyst such as mercury sulphate. The method to be followed may advantageously be adopted from that set forth in U. S. Patent 1,084,581. The products obtained are those which would be obtained by the method set forth hereinabove using acetaldehyde as the specific aldehyde.

The reaction involved may be represented, as follows:

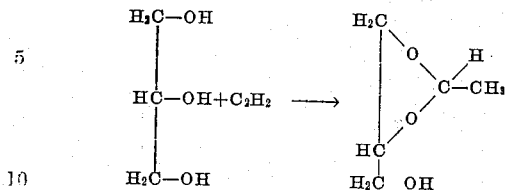

In lieu of glycerin one may substitute chlorhydrin in which case the corresponding chlor acetal is obtained. The corresponding ester may be prepared from the acetal glycerin by the usual methods employed in the esterification of analagous alcohols.

The ether derivatives may be prepared advantageously by reacting an alkali alcoholate, such as sodium phenate with the chlor acetal glycerin substantially as hereinafter set forth:

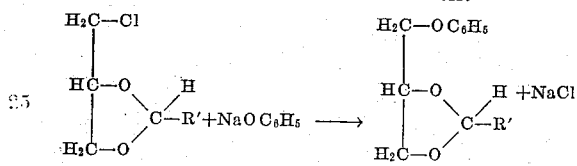

Other ether groups may be introduced by substituting the corresponding alcohol or phenol.

The exact constitution of the plasticizing compositions may vary. It is not unlikely that two isomers are formed which may be represented structurally as follows:

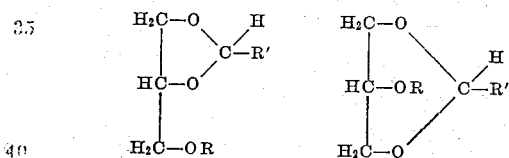

These may be separated by crystallization or otherwise. However, they have been found to give satisfactory results and may be employed advantageously in admixture with each other. Both isomers are accordingly considered herein as equivalents. When incorporated with cellulose acetate, cellulose nitrate, as well as cellulose ethers they display a degree of retentivity which is uncommon, particularly in the case of acetyl cellulose. Thus, for example, films containing equal parts of cellulose acetate and the benzoate acetal do not show the usual tendency to crystallize or "sweat".

In general the aforedescribed compositions have common desirable characteristics in that they are good solvents, possess a high degree of retentivity, light stability, are insoluble in water and are not readily decomposed. Various combinations of aldehydes or their equivalents with acids, phenols or alcohols may be employed to obtain products having wide range of boiling points. The precise method of practicing the invention, including the manner of incorporating the compositions, blending the same with other solvents, plasticizers, pigments, dyes and other modifying agents varies widely according to the use to be made of the ultimate product.

Although the manner of utilizing the present novel class of high boiling solvent and plasticizers is well known to those skilled in the art, illustrative embodiments of the invention are hereinafter set forth: Dissolve 10 parts by weight of low viscosity cotton in a mixture of low boiling solvents and thereafter incorporate 5 parts by weight of the formal glycerol benzoate. After a uniform solution is obtained, it is poured on a smooth surface where the low boiling solvent is allowed to evaporate leaving a film consisting of nitro-cellulose and the benzoate acetal which is flexible, tough and light stable.

In lieu of the nitro-cellulose employed in the previous example, substitute 5 parts cellulose acetate which is first dissolved in a low boiling solvent after which 5 parts by weight of formal glycerol phthalate is incorporated. A film obtained from this mixture will be found to be clear, pliable and evidence little or no tendency to sweat even upon long standing.

In employing these compositions in the manufacture of synthetic resins such as phenol-formaldehyde resins, the materials are incorporated while the resin is in a fluid condition and before it has attained a permanently infusible stage, in a manner well known to those skilled in the art.

Certain of the compositions, such, for example, as formal glycerol acetate have somewhat lower boiling points and may be employed advantageously as high boiling solvents for nitro-cellulose or acetyle cellulose products in a manner well understood to those skilled in the art.

It is to be understood, of course, that the foregoing examples are intended to illustrate the wide applicability of the invention to the plastic arts and that the principles may be varied to suit individual requirements and conditions under which this new class of plasticizer and solvent compositions may be employed.

While in the claims the formula of but one isomer is set forth, it is to be understood that the claims contemplate not only the specific isomer but also other isomers as well as mixtures thereof.

What I claim is:

1. A composition of matter comprising cellulose acetate admixed with a neutral ester of a carboxylic acid and an acetal of glycerol and acetaldehyde in an amount sufficient to plasticize the cellulose acetate.

2. A composition of matter comprising a cellulose ester and a neutral water insoluble carboxylic acid ester of an acetal of glycerol in an amount sufficient to plasticize the cellulose ester.

3. A composition of matter comprising a cellulose ester selected from a class consisting of cellulose acetate and cellulose nitrate admixed with a neutral ester of an acid selected from a class consisting of acetic acid, propionic acid, phthalic acid, succinic acid, maleic acid and benzoic acid with an acetal of glycerol, said neutral ester being in an amount sufficient to plasticize said cellulose ester.

4. A composition of matter as defined in claim 2 in which the carboxylic acid contains two carboxyl groups.

5. A composition of matter as defined in claim 2 in which the carboxylic acid is phthalic acid.

6. A composition of matter comprising a cellulose ester admixed with an ester of a dicarboxylic acid with an acetal of glycerol and acetaldehyde, said latter ester being in an amount sufficient to plasticize said cellulose ester.

7. A composition of matter as defined in claim 6 in which the dicarboxylic acid is phthalic acid.

JOSEPH R. MARES.